(12) United States Patent
Bates et al.

(10) Patent No.: US 8,417,092 B1
(45) Date of Patent: Apr. 9, 2013

(54) SYSTEM, METHOD, AND PROGRAM FOR RECORDING PRESENTABLE DATA ACCESSED THROUGH INTERACTIVE LINKS DISPLAYED BY AN INTERACTIVE TELEVISION PROGRAM

(75) Inventors: Cary Lee Bates, Rochester, MN (US); Mahdad Majd, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1698 days.

(21) Appl. No.: 09/637,397

(22) Filed: Aug. 11, 2000

(51) Int. Cl.
*H04N 9/80* (2006.01)
*H04N 7/173* (2011.01)
*H04N 7/16* (2011.01)

(52) U.S. Cl.
USPC ........... 386/239; 386/240; 725/109; 725/110; 725/134; 725/142

(58) Field of Classification Search .................. 725/110, 725/36, 37, 42, 131, 133, 134, 109, 141.142; 386/83, 85, 239, 240
See application file for complete search history.

(56) References Cited

U.S. PATENT DOCUMENTS

| 3,846,819 A | 11/1974 | Warren |
| 4,390,906 A | 6/1983 | Furumoto et al. |
| 6,282,713 B1 * | 8/2001 | Kitsukawa et al. ............. 725/36 |

FOREIGN PATENT DOCUMENTS

WO   WO 98/48566   * 10/1998

* cited by examiner

*Primary Examiner* — Vincent Boccio
(74) *Attorney, Agent, or Firm* — Roy W. Truelson (57) ABSTRACT

A system, method, and program product for recording presentable data accessed through interactive links displayed within an interactive television program are disclosed. In accordance with the present invention, an interactive television recording device receives an interactive television signal containing one or more interactive links associated with presentable data. In response to receipt of a record command, the interactive television recording device records the interactive television program, and the presentable data associated with the one or more interactive links are accessed and recorded into a designated storage medium. In a preferred embodiment, the interactive television signal and the one or more interactive links are stored on a first data storage medium, while the presentable data are separately stored on a second data storage medium. If a play command is received, the interactive television recording device plays the interactive television signal from the first data storage medium. If the user activates an interactive link, the interactive television recording device retrieves and plays the presentable data associated with the interactive link from the second data storage medium.

21 Claims, 7 Drawing Sheets

SYSTEM, METHOD, AND PROGRAM FOR RECORDING PRESENTABLE DATA ACCESSED THROUGH INTERACTIVE LINKS DISPLAYED BY AN INTERACTIVE TELEVISION PROGRAM

BACKGROUND OF THE INVENTION

1. Technical Field

The present invention relates in general to interactive television, and, in particular, to recording and playing back interactive television programs. Still more particularly, the present invention relates to a system, method, and program for recording and playing back presentable data accessed though interactive links displayed by an interactive television program.

2. Description of the Related Art

Interactive television is a video and audio technology that allows a user to interact with television programs. Interactive television involves broadcasting television programs containing links to networked information, such as web pages, that a viewer may selectively access. Examples of interactive television include web TV, Internet access, video on demand, and video conferencing. Web TV allows a user to view a web TV program, and while viewing the web TV program, activate links to the Internet or World Wide Web embedded in the program to retrieve and display web pages associated with the links. A web TV program generally is received utilizing an interactive television set-top box, which is a device that converts a broadcast television signal into an input video signal for display by a television set. The set-top box also allows a user to access and view pages of the World Wide Web through an interactive television communication device, such as a modem device, coupled to an interactive television communication line, such as a telephone or cable television line, that provides networked access to the World Wide Web. The set-top box converts and displays the broadcast television signal to display web pages on the television.

To record interactive television programs, a video recording device, such as a video cassette recorder (VCR), is typically interposed between the set-top box and the television set. When the VCR is set to record a television program, the VCR records the data of the web TV program, which may be in Moving Pictures Experts Group (MPEG) format, for later display on the television set. The existing recording technology also allows information viewed on the television screen that resulted from the user activating links to networked information (e.g., web pages) to be recorded. However, existing VCRs cannot record the networked information for any links that were not displayed or viewed on the television screen. Existing VCRs consequently do not allow the viewer to interact with a recorded television program in the same way as a live broadcast program since existing VCRs do not record the data associated with any links in which the associated data were not displayed by the television set. For example, the viewer uses the VCR to record a television show having links to the World Wide Web. When the viewer plays back the web TV program on the VCR, the viewer may activate a link within the recorded web TV program being played back on the television set. The VCR will then access or attempt to access through the set-top box the web page (e.g., web address) on the World Wide Web associated with the activated link. In addition, when the displayed within the web TV program may have changed or may no longer exist.

Therefore, the present invention recognizes the need to record and play back interactive television programs in a manner that more closely resembles the programs during the original broadcast. In particular, the present invention recognizes the need to record and play back presentable data accessible though interactive links that are displayed within an interactive television program.

SUMMARY OF THE INVENTION

A system, method, and program product for recording presentable data accessed through interactive links displayed within an interactive television program are disclosed. In accordance with the present invention, an interactive television recording device receives an interactive television signal containing one or more interactive links associated with presentable data. In response to receipt of a record command, the interactive television recording device records the interactive television program, and the presentable data associated with the one or more interactive links are accessed and recorded into a designated storage medium.

In a preferred embodiment, the interactive television signal and the one or more interactive links are stored on a first data storage medium, while the presentable data are separately stored on a second data storage medium. If a play command is received, the interactive television recording device plays the interactive television signal from the first data storage medium. If the user activates an interactive link, the interactive television recording device retrieves and plays the presentable data associated with the interactive link from the second data storage medium.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
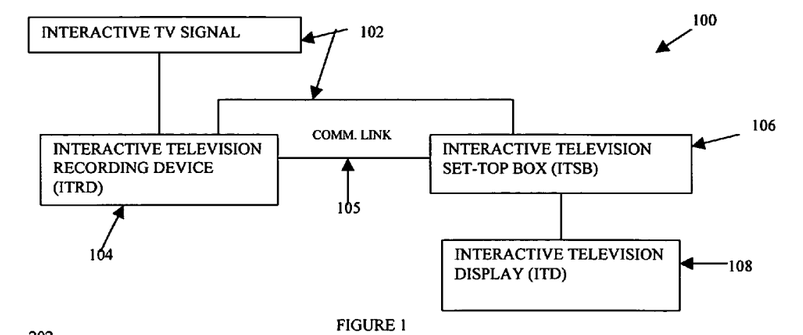
FIG. 1 is a block diagram of an exemplary system for recording and playing back presentable data accessed though interactive links displayed within an interactive television program in accordance with the present invention.

With reference now to FIG. 1, an exemplary system 100 for recording and playing back presentable data accessed though interactive links within an interactive television program is shown. System 100 of FIG. 1 includes an interactive television recording device ("ITRD") 104 coupled to an interactive television set-top box ("ITSB") 106, which is in turn coupled to an interactive television display ("ITD") 108, such as an interactive television set. An interactive television set may be a conventional television set coupled to an interactive set-top box. A communication link 105 transmits user commands from ITSB 106 to ITRD 104. Interactive television signal 102 is received by ITRD 104, which passes interactive television signal 102 to ITSB 106. ITSB 106 is a device that converts interactive television signal 102 to an input signal for display of the interactive TV program by ITD 108. ITSB 106 also allows the user to access the World Wide Web and display web pages on ITD 108.

Interactive television signal 102 is a broadcast signal for providing interactive television programs, such as web TV programs, to ITD 108. Within the interactive television programs broadcast through interactive television signal 102, links, such as hyperlinks, may be displayed so that the user is able to select the links and access networked information. Networked information may include web pages, files, scripts, or documents that contain images, phrases, words, symbols, or other elements.

To record an interactive television program within interactive television signal 102, the user inputs a record command into ITSB 106, which transmits the record command to ITRD 104. ITRD 104 responds to the record command by recording the data for the interactive television program onto a first data storage medium, such as a first track of a video tape. ITRD 104 also records the links that may be displayed within the interactive television program onto the first data storage medium. The links within the interactive TV program are directly associated with addresses (e.g., Uniform Resource Locators ("URLs")) of interactive television sites, such as web sites. ITRD 104 further records the data associated with the links, preferably separately from the data for the interactive television program. For example, the data associated with the link may be recorded on a second data storage medium, such as a second track of the video tape. Exemplary data associated with a link would be the Hypertext Markup Language ("HTML") data that defines a web page located at an address.

To play back the interactive television program stored on the data storage medium, the user inputs a playback command into ITSB 106, which forwards the playback command to ITRD 104. In response to the playback command, ITRD 104 retrieves the data for the interactive television program from the first data storage medium (e.g., the first track of a video tape) and causes the data, including any links, to be displayed by ITD 108. ITRD 104 also allows the user to selectively display the data associated with the links from the second data storage medium (e.g., the second track of the video tape) when the user selects links during the play back of the interactive television program.

Figure 2:
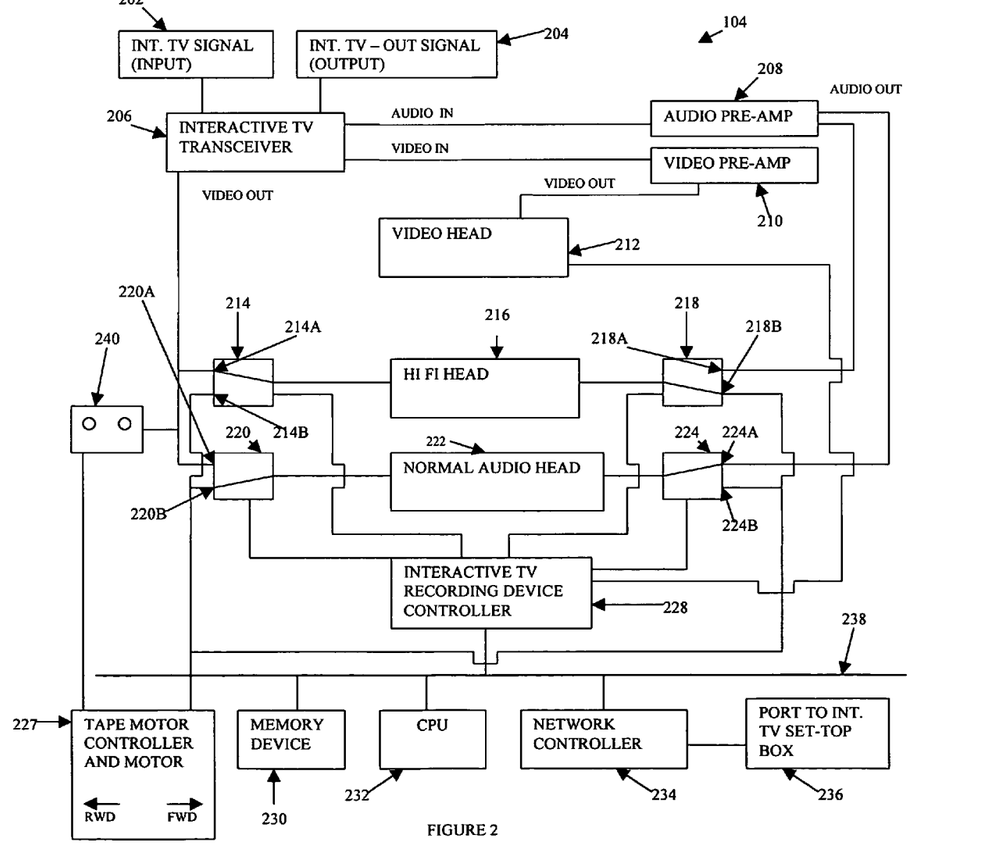
FIG. 2 is a more detailed block diagram of an exemplary embodiment of the interactive television recording device in the system of FIG. 1.

Referring now to FIG. 2, a more detailed block diagram of an exemplary ITRD 104 is shown. Exemplary ITRD 104 includes an interactive television ("TV") transceiver 206, which receives interactive television ("TV") signal 102. Interactive TV transceiver 206 transmits interactive TV signal 102 to ITSB 106. Audio pre-amplifier ("audio pre-amp") 208 and video pre-amplifier ("video pre-amp") 210 are coupled to interactive TV transceiver 206. Interactive TV transceiver 206 splits interactive TV signal 102 into a video signal and an audio signal.

Video pre-amp 210 receives and amplifies the video-in signal to produce a video-out signal. Video head 212 receives the amplified video-out signals. Video head 212 reads from and writes video data to a program storage medium, such as to a video track of a video cassette 240.

Figure 8:
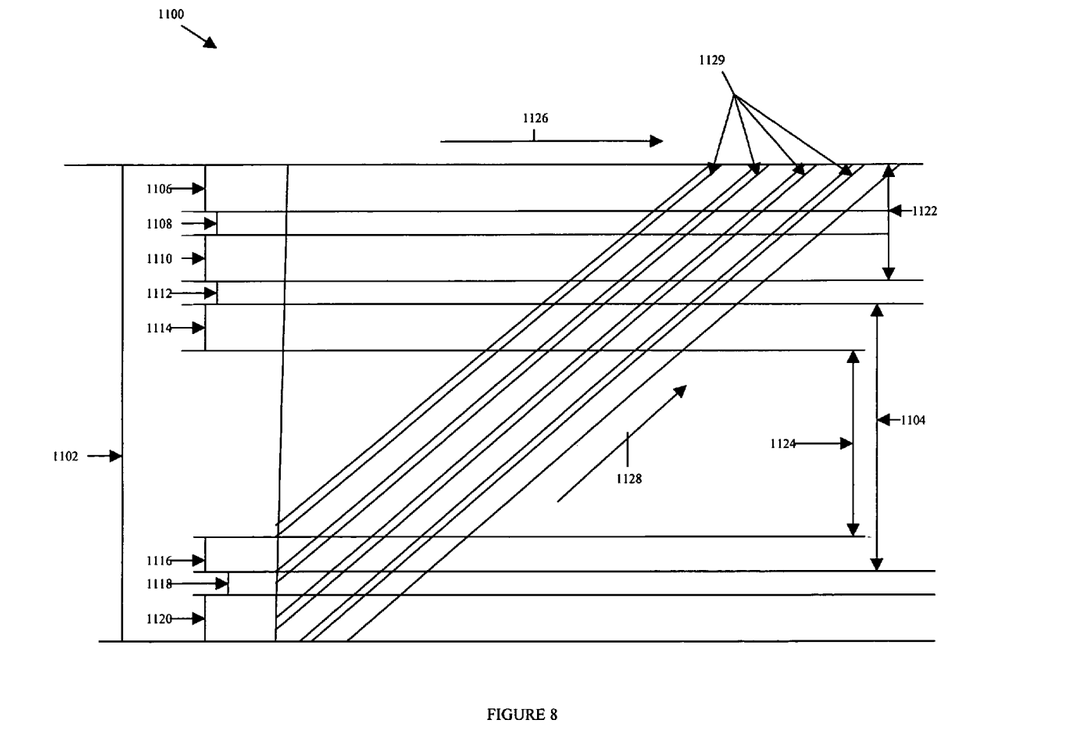
FIG. 8 depicts a video tape used by the present invention to store data for the interactive television program.

Audio pre-amp 208 receives and amplifies the audio-in signal to produce an audio-out signal. The audio-out signal may be separated into two signals: a normal audio signal and a hi-fi audio signal. The normal audio signal is typically read from or written to a normal audio track 1110 (as shown in FIG. 8) of video cassette 240 while the hi-fi audio signal is read from or written to a hi-fi audio track 1106 (as shown in FIG. 8). Depending on the quality of the broadcast or recorded signal, the user may choose between a normal audio mode or a hi-fi audio mode. ITRD 104 includes both a high fidelity ("hi-fi") head 216 and a normal audio head 222 to read from and write to normal audio and hi-fi audio tracks 1110 and 1106, respectively.

Hi-fi head 216 is coupled to switches 214 and 218. Switch 214 may be activated along a switch path 214A to couple hi-fi head 216 to the video-out signal from interactive TV transceiver 206 or may alternatively be activated along a switch path 214B to couple hi-fi head 216 to a program storage medium, such as video cassette 240. Furthermore, switch 218 may be activated along a switch path 218A to couple hi-fi head 216 to the audio-out signal from audio pre-amp 208 to or may alternatively be activated along a switch path 218B to couple hi-fi head 216 to program storage medium, such as video cassette 240. Normal audio head 222 is further coupled to switches 220 and 224. Switch 220 may be activated along a switch path 220A to couple normal audio head 222 to the video-out signal from interactive TV transceiver 206 or may alternatively be activated along a switch path 220B to couple normal audio head 222 to program storage medium, such as video cassette 240. Also, switch 224 may be activated along a switch path 224A to couple normal audio head 222 to the audio-out signal from audio pre-amp 208 or may alternatively be activated along a switch path 224B to couple normal audio head 222 to program storage medium, such as video cassette 240.

An interactive television ("TV") recording device controller 228 is coupled to hi-fi head 216 via switches 214 and 218 and is coupled to normal audio head 222 via switches 220 and 224. Interactive TV recording device controller 228 is further coupled to video head 212. Interactive TV recording device controller 228 controls the operations (e.g., record, playback, rewind, forward, stop, pause) performed by ITRD 104. Interactive TV recording device controller 228 controls switches 214 and 218 to switch hi-fi head 216 between handling and processing the data associated with the links within interactive TV signal 102 and the audio signal of interactive TV signal 102. Interactive TV recording device controller 228 respectively controls switches 220 and 224 to switch normal audio head 222 between handling and processing the audio signal of interactive TV signal 102 and the data associated with the links within interactive TV signal 102.

For example, if interactive TV recording device controller 228 is programmed to activate switch 214 to switch path 214A, switch 218 to switch path 218B, switch 220 to switch path 220B, and switch 224 to switch path 224A (as shown in FIG. 2), then hi-fi track 1106 of video cassette 240 stores or retrieves the data associated with the links within interactive TV signal 102 and normal audio track 1110 of video cassette 240 stores or retrieves the audio signal of interactive TV signal 102. In this case, the paths that result from the activated paths of switches 214, 218, 220, and 224 allow hi-fi head 216 to write the link data within the video-out signal to or read the link data within the video-out signal from the hi-fi track of program storage medium, such as video cassette 240, and further allow normal audio head 222 to write the audio-out signal to or read the audio-out signal from normal audio track 1110 of program storage medium, such as video cassette 240. Alternatively, if interactive TV recording device controller 228 is programmed to activate switch 214 to switch path 214B, switch 218 to switch path 218A, switch 220 to switch path 220A, and switch 224 to switch path 224B, then hi-fi track 1106 of video cassette 240 stores or retrieves the audio signal of interactive TV signal 102 and normal audio track 1110 of the video tape stores or retrieves the data associated with the links within interactive TV signal 102. In this situation, the paths that result from the activated paths of switches 214, 218, 220, and 224 allow hi-fi head 216 to write the audio-out signal to or read the audio-out signal from hi-fi track 1106 of video cassette 240 and allow normal audio head 222 to write the link data within the video-out signal to or read the link data within the video-out signal from normal audio track 1110 of video cassette 240.

ITRD controller 228 is coupled to a control bus 238. The video tape portion of video cassette 240, which may contain both the first and second storage mediums (e.g., at least two separate tracks of the video tape), is able to interface with video head 212, hi-fi head 216, and normal audio head 222. A tape motor controller and motor unit 227 is also coupled to control bus 238. Tape motor controller and motor unit 227 drives the reels of video cassette 240 to move the video tape in the desired forward or rewind/reverse direction. Video head 212, hi-fi head 216, and normal audio head 222 reads interactive TV signals 102 from or writes interactive TV signals 102 to a series of oblique tracks 1129 as shown in FIG. 8. Heads 212, 216, and 222 are positioned to read and write in the direction indicated by an arrow 1128 as shown in FIG. 8 so that heads 212, 216, and 222 properly read from or write to oblique tracks 1129.

A memory device 230, a central processing unit ("CPU") 232, and a network controller 234 are also coupled to control bus 238. Memory device 230 provides ITRD 104 with data storage. CPU 232 and ITRD controller 228 control the overall operation of ITRD 104, such as the play, record, rewind, forward, stop, and pause functions of ITRD 104. Network controller 234 controls the communication between ITRD 104 and the interactive network (e.g., Internet or World Wide Web). A port 236 couples ITRD 104 to ITSB 106.

Figure 3:
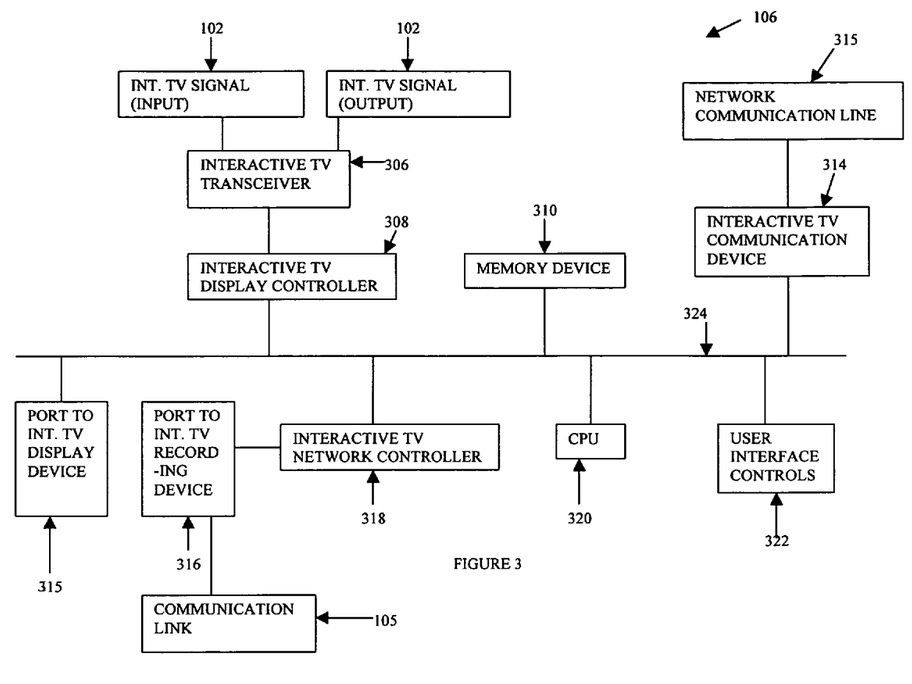
FIG. 3 is a more detailed block diagram of an exemplary interactive television set-top box in the system of FIG. 1.

With reference now to FIG. 3, a more detailed block diagram of an exemplary embodiment of ITSB 106 is shown. As stated earlier, ITSB 106 is a device that converts interactive television signal 102 to an input signal suitable for display by ITD 108 and that also allows the user to access the World Wide Web and display web pages on ITD 108. ITSB 106 includes an interactive TV transceiver 306, which is coupled to an interactive TV display controller 308 that is, in turn, coupled to a control bus 324. A port 315 leading to ITD 108 is also coupled to control bus 324. Interactive TV transceiver 306 receives interactive television ("TV") signal 102 from ITRD 104 and transmits and processes interactive TV signal 102 for display onto ITD 108 through port 315. Interactive TV display controller 308 controls the display of the ITD 108 through port 315.

ITSB 106 also includes an interactive television ("TV") communication device 314, such as a modem, coupled to control bus 324. Interactive TV communication device 314 is coupled to a network communication line 315, which provides ITSB 106 with access to an interactive television ("TV") network, such as the Internet or World Wide Web. A central processing unit ("CPU") 320, a memory device 310, and user interface controls 322, such as a keyboard, a mouse, and/or web surfing controller, are also coupled to control bus 324. Memory device 310 is used for storage and for caching data associated to a link, and a central processing unit ("CPU") 320 is utilized for controlling operation of ITSB 106. An interactive television ("TV") network controller 318 is further coupled to control bus 324. Interactive TV network controller 318 controls the communication between ITSB 106 and the interactive TV network (e.g., the Internet or World Wide Web) received through network communication line 315. An user utilizes user interface controls 322 to select a link to retrieve and display data associated with the link from the interactive TV network through communication link 105 onto ITD 108. CPU 320 and memory device 310 receive and process the selection of the link by retrieving the data associated with the link from the interactive TV network through network communication line 315 and interactive TV communication device 314 and by storing the data to memory device 310. Interactive TV network controller 318 then controls display of the data from memory device 310 by ITD 108 through port 315.

A port 316 leading to an interactive TV recording device, such as ITRD 104, is also coupled to interactive TV network controller 318. ITRD 104 is coupled to ITSB 106 through port 316. Communication link 105 is coupled to port 316 in order to couple ITRD 104 to ITSB 106. The user enters a command for ITRD 104, such as a record, playback, forward, reverse, stop, or pause command, through user interface controls 322. CPU 320 directs the command from ITSB 106 to ITRD 104 through port 316 and communication link 105. ITRD 104 then receives and correspondingly responds to the command by performing the requested operation based on the received command.

Figure 4:
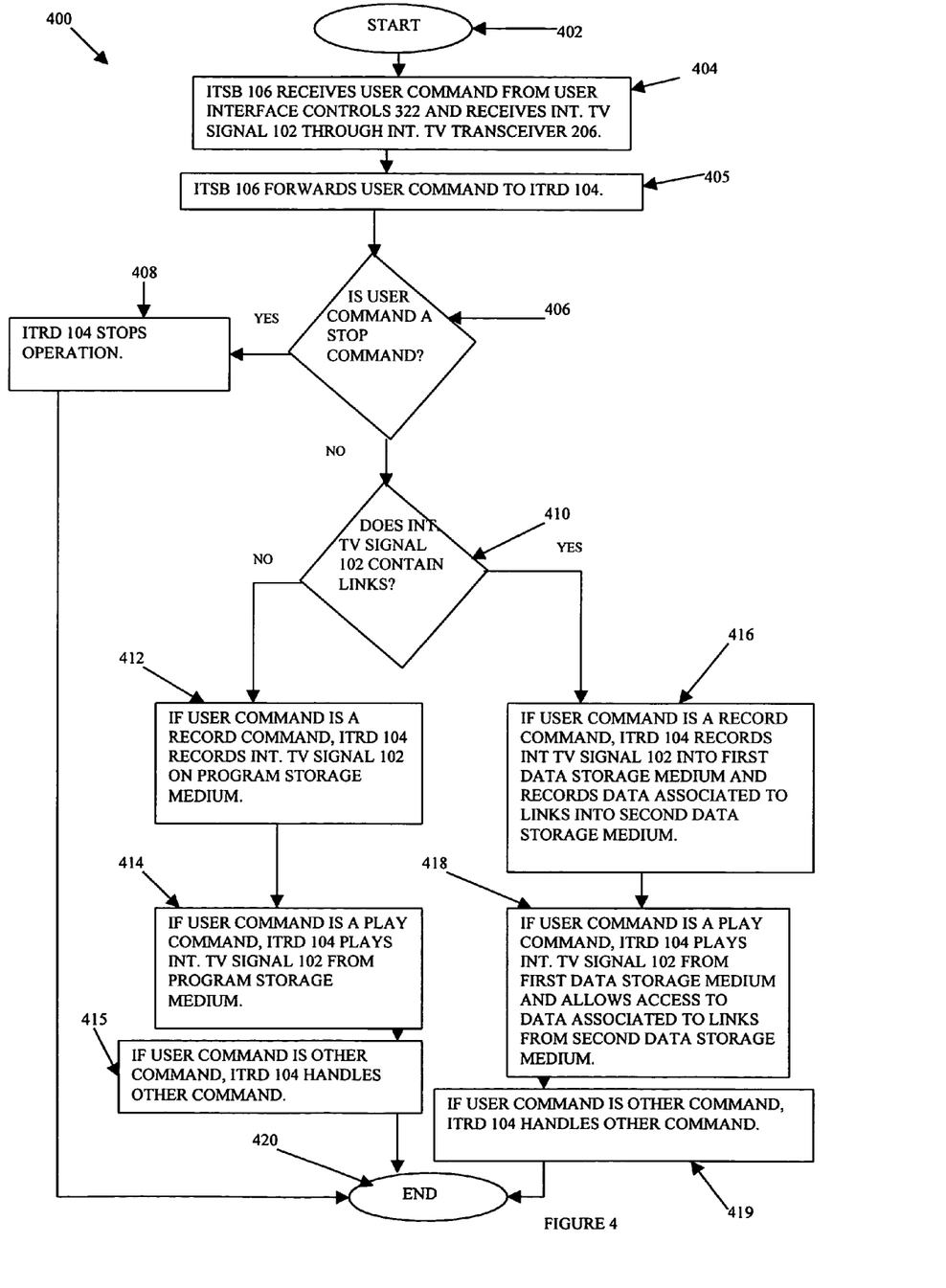
FIG. 4 is a flow chart of an exemplary method and program function for operating the interactive television recording device and the interactive television set-top box of FIG. 3 in accordance with the present invention.

Referring now to FIG. 4, a flow chart of an exemplary method 400 and program function for operating exemplary ITSB 106 of FIG. 3 and ITRD 104 of FIG. 4 in accordance with the present invention is shown. The program according to method 400 is stored in a memory device, such as memory devices 230 and 310, and is executed by one or more processor, such as CPUs 232 and 320. The program has a control program that is encoded in a computer usable media, such as a memory device 230 or 310, that causes ITSB 106 and/or ITRD 104 to perform the steps of method 400.

Method 400 starts at block 402 and proceeds to block 404, which shows ITSB 106 receiving a user command through user interface controls 322 and also receiving interactive TV signal 102 through interactive TV transceiver 206. Following block 404, block 405 depicts ITSB 106 forwarding the user command to ITRD 104. Method 400 next proceeds to decision block 406, which depicts a determination of whether the user command is a stop command. If a determination is made at decision block 406 that the user command is a stop command, then method 400 moves from decision block 406 to block 408, which represents ITRD 104 stopping the current operation. Method 400 then ends at block 420. However, if a determination is made at decision block 406 that the user command is not a stop command, then method 400 proceeds from decision block 406 to decision block 410.

Decision block 410 shows a determination of whether interactive TV signal 102 contains links (e.g., hyperlinks). If a determination is made at decision block 410 that interactive TV signal 102 does not contain links, then method 400 moves from decision block 410 to blocks 412, 414, and 415. Block 412 depicts that if the user command is a record command, then ITRD 104 records interactive TV signal 102 on program storage medium, such as video cassette 240 having a video tape 1100. Block 414 shows that if the user command is instead a play command, then ITRD 104 plays interactive TV signal 102 stored on program storage medium, such as video cassette 240. Block 415 represents that if the user command is any other command, then ITRD 104 handles such other command in the appropriate manner. Method 400 then ends at block 420.

Returning to block 410, if a determination is made that interactive TV signal 102 does contain links, then method 400 instead moves from decision block 410 to blocks 416, 418, and 419. Block 416 depicts that if the user command is a record command, then ITRD 104 records interactive TV signal 102 in a first data storage medium, such as a video signal recording band 1104 and normal audio track 1110 of video tape 1100 in FIG. 8. ITRD 104 also records data associated with the links on a second data storage medium, such as hi-fi audio track 1106 of video tape 1100 in FIG. 8. Block 418 shows that if the user command is a play command, then ITRD 104 plays and displays on ITD 108 interactive TV signal 102 from the first data storage medium, such as video signal recording band 1104 and normal audio track 1110 of video tape 1100. ITRD 104 allows access to the data associated with the links from the second data storage medium, such as hi-fi audio track 1106 of video tape 1100, and displays the data on ITD 108 when the links are selected (e.g., when the user "clicks" on the links). Block 419 represents that if the user command is any other command, then ITRD 104 handles such other command in the appropriate manner. Method 400 finally ends at block 420.

Figure 5:
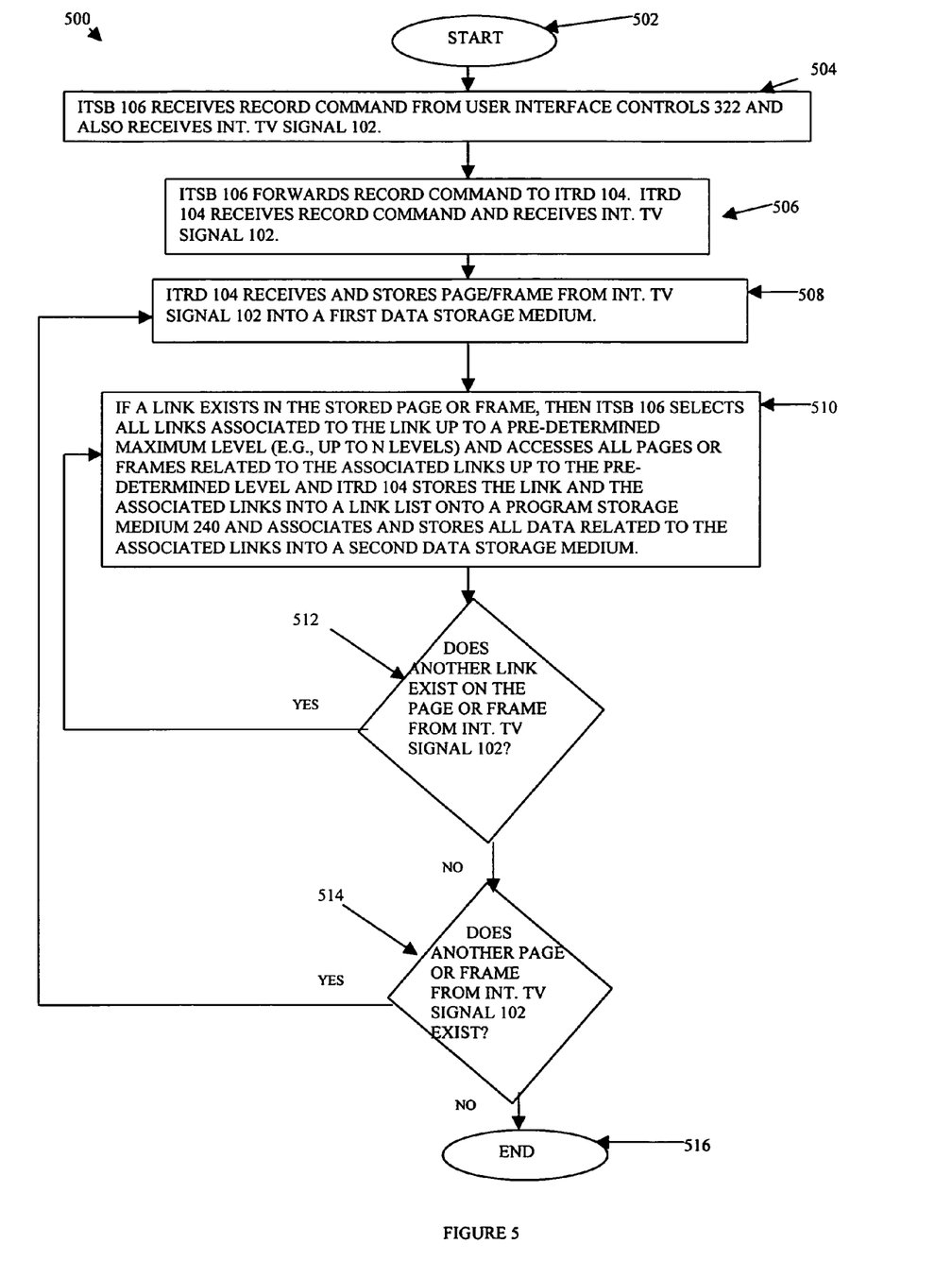
FIG. 5 is a flow chart of a more detailed, exemplary method and program function for the recording operation in the method and program function of FIG. 4.

Referring now to FIG. 5, a flow chart of a more-detailed, exemplary method 500 and program function for the recording operation of method 400 is shown. The program has a control program that is encoded in a computer usable media, such as a memory device 230 or 310, that causes ITSB 106 and/or ITRD 104 to perform the steps of method 500. Method 500 starts at block 502 and then proceeds to block 504, which shows that ITSB 106 receives the record command from user interface controls 322 and also receives interactive TV signal 102. Method 500 then proceeds to block 506, which depicts ITSB 106 forwarding the record command to ITRD 104. ITRD 104, in turn, receives the record command and also receives interactive TV signal 102. Following block 506, block 508 shows ITRD 104 receiving and storing a page or frame from interactive TV signal 102 into a first data storage medium (e.g., video signal recording band 1104 and normal audio track 1110).

Method 500 then moves to block 510. Block 510 illustrates that if a link exists in the stored page or frame, then ITSB 106 selects all links associated with the link up to a pre-determined maximum level (e.g., up to N levels) and accesses all data associated with the links up to the pre-determined level. Also, ITRD 104 stores the link and the associated links up to the pre-determined maximum level into a link list onto program storage medium, such as video cassette 240, and further stores all data related to the associated links up to the pre-determined level onto a second data storage medium (e.g., hi-fi audio track 1106).

Figure 6:
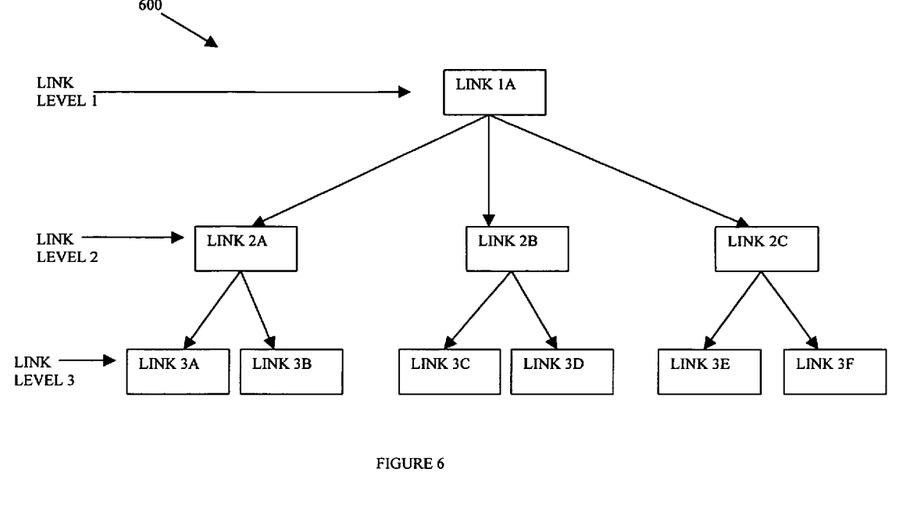
FIG. 6 is an exemplary, hierarchical tree for illustrating links that are related to a link in a retrieved page or frame up to a pre-determined maximum link level.

For example, referring to FIG. 6, an exemplary, hierarchical tree 600 illustrating links that are related to a link in a retrieved page or frame up to a pre-determined maximum link level is shown. Hierarchical tree 600 illustrates links that are related to a link 1A at link level 1 for a retrieved page or frame up to a maximum link level 3 (e.g., N equals three (3)). In method 500, ITRD 104 stores links 1A, 2A, 2B, 2C, 3A, 3B, 3C, 3D, 3E, and 3F in a link list on program storage medium, such as video cassette 240. ITRD 104 associates and stores the data associated with links 1A, 2A, 2B, 2C, 3A, 3B, 3C, 3D, 3E, and 3F into the second data storage medium (e.g., hi-fi audio track 1106). Thus, ITRD 104 stores all links and data related to links that are associated with link levels 1, 2, and 3. However, ITRD 104 does not store any links or data associated with links beyond link level 3.

Returning to FIG. 5, method 500 proceeds from block 510 to decision block 512, which depicts a determination of whether another link exists on the page or frame from interactive TV signal 102. If a determination is made at decision block 512 that there is another link in the page or frame, then method 500 returns to block 510, and block 510 is repeated for another link. However, if a determination is made at decision block 512 that the page or frame does not contain another link, then method 500 proceeds to decision block 514. Decision block 514 depicts a determination whether interactive TV signal 102 contains another page or frame. If so, then method 500 returns to block 508, and the method steps at blocks 508, 510, and 512 are repeated for another page or frame. On the other hand, if the determination is made at decision block 514 that another page or frame does not exist, such as when a stop command terminates recording (e.g., at the end of the program or when the user depresses a "stop" button), then method 500 ends at block 516.

Figure 7:
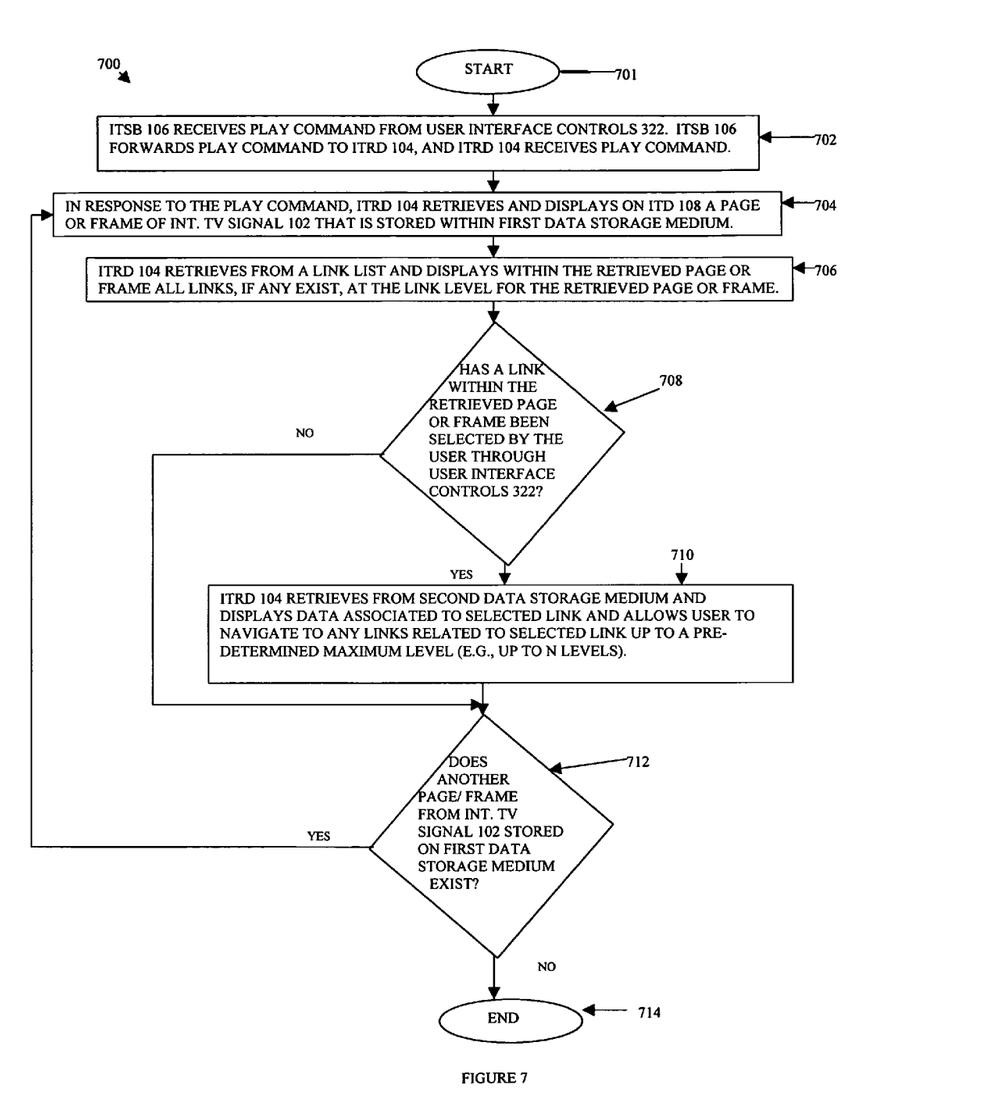
FIG. 7 is a flow chart of a more detailed, exemplary method and program function for the playback operation in the method and program function of FIG. 4.

With reference now to FIG. 7, a flow chart of a more detailed, exemplary method 700 and program function for the playback operation in method 400 is shown. The program has a control program that is encoded in a computer usable media, such as a memory device 230 or 310, that causes ITSB 106 and/or ITRD 104 to perform the steps of method 700. Method 700 starts at block 701 and then moves to block 702, which depicts ITSB 106 receiving the play command from user interface controls 322. ITSB 106 forwards the play command to ITRD 104, and ITRD 104 receives the play command. Method 700 then proceeds to block 704, which shows that in response to the play command, ITRD 104 retrieves and displays on ITD 108 a page or frame of interactive TV signal 102 that is stored within the first data storage medium (e.g., video signal recording band 1104 and normal audio track 1110). Following block 704, block 706 illustrates ITRD 104 retrieving from a link list and displaying within the retrieved page or frame all links (e.g., link 1A), if any exist, at the highest link level for the retrieved page or frame (e.g., link level 1 in FIG. 6).

Method 700 next moves to decision block 708, which represents a determination of whether a link within the retrieved page or frame has been selected by the user through user interface controls 322. If the determination is made at decision block 708 that a link has been selected (e.g., link 1A in FIG. 6 has been selected), then method 700 moves from decision block 708 to block 710. Block 710 illustrates that ITRD 104 retrieves from the second data storage medium (e.g., hi-fi audio track 1106) and displays data associated to the selected link (e.g., link 1A in FIG. 6) on ITD 108. ITRD 104 further allows the user through utilization of user interface controls 322 to navigate any links (e.g., links 2A, 2B, 2C, 3A, 3B, 3C, 3D, 3E, and 3F) related to the selected link (e.g., link 1A in FIG. 6) up to a pre-determined maximum level (e.g., maximum link level 3). If the user utilizing user interface controls 322 attempts to select any of the associated links beyond the pre-determined maximum level (e.g., beyond link level 3), then ITRD 104 displays on ITD 108 an error message indicating that the data for the selected link is inaccessible or, alternatively, ITRD 104 attempts to retrieve and display the page for the associated link from the Internet or World Wide Web. Method 700 then moves from block 710 to decision block 712. On the other hand, if the determination is made at decision block 708 that a link has not been selected, then method 700 moves directly from decision block 708 to block 712.

Decision block 712 illustrates a determination made whether another page or frame from interactive TV signal 102 stored on the first data storage medium exists. If a determination is made at decision block 712 that such another page or frame does exist, then method 700 returns to block 704 and repeats the method steps in blocks 704, 706, 708, and 710 for another page or frame. On the other hand, if a determination is made at decision block 712 that such another page or frame does not exist, such as when the user play command has been switched to a stop command (which may have been either user activated or activated by the end of the play of interactive TV signal 102 from program storage medium, such as video cassette 240), then method 700 ends at block 718.

With reference now to FIG. 8, a portion of a video tape 1100 on which data for an interactive television program from interactive TV signal 102 are stored is shown. Video tape 1100 is transported in the direction indicated by arrow 1126 by tape motor controller and motor 227 of ITRD 104. Video tape 1100 has a width 1102 and includes a video signal recording band 1104 with front and back overlapping bands 1114 and 1116. Video signal recording band 1104 has a contact band 1124 with which at least video head 212 makes contact. Video tape 1100 also has an audio track 1122, including a hi-fi audio track 1106 and a normal audio track 1110. Hi-fi head 216 makes contact with hi-fi audio track 1106 while normal audio head 222 makes contact with normal audio track 1110. A first guard band 1108 exists between hi-fi audio track 1106 and normal audio track 1110. A second guard band 1112 exists between audio track 1122 and video signal recording band 1104. Video tape 1100 further has a control track 1120. A third guard band 1118 exists between control track 1120 and video signal recording band 1104. Guard bands 1108, 1112, and 1118 exist as conventional separations between the other tracks and bands of video tape 1100. Heads 212, 216, and 222 utilize guard bands 1108, 1112, and 1118 to guide in reading from or writing to the correct band or track of video tape 1100.

ITRD controller 228 may be programmed to control hi-fi head 216 and normal audio head 222 so that hi-fi head 216 is setup for reading and writing presentable data associated with the links from and to hi-fi audio track 1106 of video tape 1100, while normal audio head 222 is setup for reading and writing the audio signal of interactive TV signal 102 from and to normal audio track 1110. Alternatively, ITRD controller 228 may be programmed to control hi-fi head 216 and normal audio head 222 so that hi-fi head 216 is setup for reading and writing the audio signal of interactive TV signal 102 from and to hi-fi audio track 1106, while normal audio head 222 is setup for reading and writing the presentable data associated with the links from and to normal audio track 1110.

Figure 9:
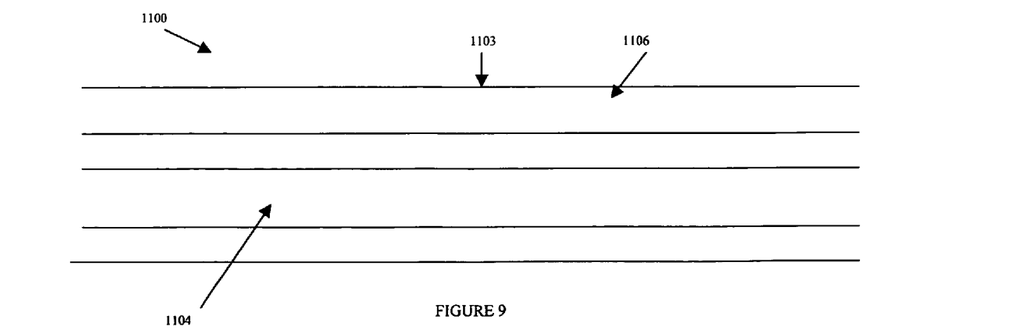
FIG. 9 illustrates a segment of a video tape showing a location where data associated with an interactive link is stored.

Referring now to FIG. 9, a segment 1103 of video tape 1100 in which the data associated with links are stored on hi-fi audio track 1106 is shown. The same page or frame of interactive TV signal 102 may be stored over segment 1103 of video tape 1100. For efficient storage, data associated with a link(s) for segment 1103 are cached into memory device 310 of ITSB 106 as the data is stored during a record operation to or retrieved during a playback operation from hi-fi audio track 1106. If the user activates a link during the playback of segment 1103, then the data associated with the link(s) are retrieved from memory device 310 which stores the cached data. Alternatively, if the data associated with the link(s) are not found in memory device 310, then ITSB 106 attempts to retrieve and display the current page(s) associated to the link(s) from the Internet or World Wide Web.

The present invention discloses a system, method, and program product for recording presentable data accessed through interactive links displayed within an interactive television program. The present invention allows a VCR or other recording device to record the networked information for links that were not necessarily displayed or viewed on the television screen and also allows the user to interact with the television program much the same way as when it was originally broadcast. The present invention allows the data associated with any links to be recorded and later played back up to a pre-determined or pre-set linking level. The present invention is not in any way limited to a VCR or video tape technology, and the present invention may be used or adapted to be utilized with any suitable recording medium that records and plays back interactive television signals, such as digital recording devices, digital versatile disks (DVDs), compact disks (CDs), disks, and other memory devices.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for recording an interactive television program, said method comprising:

receiving, by an interactive television recording device, an interactive television signal containing a displayable television program signal and at least one interactive link, each said interactive link associated with respective presentable data not included in said interactive television signal, each said respective presentable data being separately accessed data which, responsive to selection of the respective interactive link by a viewer of said interactive television program, is accessed from a respective remote source and displayed with said interactive television program; and in response to a record input, automatically accessing, with said interactive television recording device, each said respective presentable data associated with a respective said at least one interactive link from the respective remote source and recording said interactive television signal and said presentable data into at least one data storage medium.

2. The method according to claim 1, wherein said recording step further comprises:

separately storing said interactive television signal and said at least one interactive link into a first data storage medium and said presentable data into a second data storage medium.

3. The method according to claim 2, wherein said storing step further comprises:
storing said interactive television signal and said at least one interactive link on a first track of a video tape; and
storing said presentable data elsewhere on said video tape other than said first track.

4. The method according to claim 2, further comprising:
in response to a user play command for activating playing said interactive television signal by said interactive television recording device, playing said interactive television signal from said first data storage medium; and
in response to said user activating said at least one interactive television link, retrieving and playing said presentable data associated with said at least one interactive link from said second data storage medium.

5. The method according to claim 1, wherein:
said receiving step further comprises receiving, by said interactive television recording device, a plurality of frames for said interactive television signal;
said recording step further comprises:
storing, by said interactive television recording device, said frames and said at least one associated interactive link for said frames into a first data storage medium; and
storing, by said interactive television recording device, each set of said presentable data associated with each of said at least one interactive link into said a second data storage medium.

6. The method according to claim 1, wherein at least one page of said presentable data includes at least another one interactive link, and wherein said method further comprises:
storing said at least another one interactive link into a first data storage medium; and
separately storing a set of presentable data associated with said at least another one interactive link into a second data storage medium.

7. The method according to claim 1, wherein said accessing step further comprises accessing data for a web site.

8. A system for recording an interactive television program, said system comprising:
an interactive television recording device having: (a) an interactive television transceiver for receiving an interactive television signal that includes a displayable television program signal and at least one interactive link, each said interactive link associated with respective presentable data not included in said interactive television signal, each said respective presentable data being separately accessed data which, responsive to selection of the respective interactive link by a viewer of said interactive television program, is accessed from a respective remote source and displayed with said interactive television program, (b) a write device for writing said interactive television signal to a first data storage medium, and (c) a data write device for writing said presentable data to a second data storage medium; and
wherein in response to a record input, said interactive television transceiver automatically accesses each said respective presentable data associated with a respective said at least one interactive link from the respective remote source, said write device records said interactive television signal into said first data storage medium, and said data write device records said presentable data into said second data storage medium.

9. The system according to claim 8 wherein:
said write device stores said interactive television signal and said at least one interactive link on a first track of a video tape; and
said data write device stores said presentable data elsewhere on said video tape other than said first track.

10. The system according to claim 8, wherein the interactive television recording device further comprises:
a read device for reading said interactive television signal from the first data storage medium; and
a data read device for reading said presentable data from the second data storage medium; and
wherein, in response to a user play command for activating playing said interactive television signal by said interactive television recording device, said read device retrieves and plays said interactive television signal from said first data storage medium; and
wherein, in response to said user activating said at least one interactive television link, said data read device retrieves and plays said presentable data associated with said at least one interactive link from said second data storage medium.

11. The system according to claim 8 wherein:
said interactive television transceiver receives a plurality of frames for said interactive television signal;
said write device stores said frames and said at least one associated interactive link for said frames into said first data storage medium; and
said data write device stores each set of said presentable data associated with each of said at least one interactive link into said second data storage medium.

12. The system according to claim 8, wherein at least one page of said presentable data includes at least another one interactive link, and wherein said system further comprises:
said write device stores said at least another one interactive link into said first data storage medium; and
said data write device separately stores a set of presentable data associated with said at least another one interactive link into said second data storage medium.

13. The system according to claim 8, wherein said interactive television recording device further comprises:
a network communication device for accessing data for a web site from a network.

14. The system according to claim 8, further comprising:
an interactive television set-top box having a signal processor and a network adapter;
wherein said interactive television set-top box is coupled to said interactive television recording device; and
wherein said signal processor processes said interactive television signal for display and provides communication to a network through the network adapter to access data related to the at least one interactive link.

15. A program product for recording presentable data accessed through interactive links displayed by an interactive television program, said program product comprising:
a control program encoded within a computer usable media that causes an interactive television recording device to perform the steps of:
receiving an interactive television signal containing a displayable television program signal and at least one interactive link, each said interactive link associated with respective presentable data not included in said interactive television signal, each said respective presentable data being separately accessed data which, responsive to selection of the respective interactive link by a viewer of said interactive television program, is accessed from a respective remote source and displayed with said interactive television program; and in response to a record input, automatically accessing each said respective presentable data associated with a respective said at least one interactive link from the respective remote source and recording said interactive television signal and said presentable data into a data storage medium.

16. The program product according to claim 15, wherein said recording step further comprises:

separately storing said interactive television signal and said at least one interactive link into a first data storage medium and said presentable data into a second data storage medium.

17. The program product according to claim 16, wherein said storing step further comprises:

storing said interactive television signal and said at least one interactive link on a first track of a video tape; and storing said presentable data elsewhere on said video tape other than said first track.

18. The program product according to claim 16, wherein said control program is encoded within said computer usable media that causes said interactive television recording device to further perform the steps of:

in response to a user play command for activating playing said interactive television signal by said interactive television recording device, playing said interactive television signal from said first data storage medium; and in response to said user activating said at least one interactive television link, retrieving and playing said presentable data associated with said at least one interactive link from said second data storage medium.

19. The program product according to claim 15, wherein:

said receiving step further comprises receiving, by said interactive television recording device, a plurality of frames for said interactive television signal;

said recording step further comprises:

storing, by said interactive television recording device, said frames and said at least one associated interactive link for said frames into a first data storage medium; and storing, by said interactive television recording device, each set of said presentable data associated with each of said at least one interactive link into said a second data storage medium.

20. The program product according to claim 15, wherein at least one page of said presentable data includes at least another one interactive link, and wherein said control program is encoded within said computer usable medium that causes an interactive television recording device to further perform the steps of:

storing said at least another one interactive link into a first data storage medium; and separately storing a set of presentable data associated with said at least another one interactive link into a second data storage medium.

21. The program product according to claim 15, wherein said accessing step further comprises accessing data for a web site.

\* \* \* \* \*